(12) United States Patent
Kumar et al.

(10) Patent No.: US 11,507,595 B1
(45) Date of Patent: Nov. 22, 2022

(54) AGENT-LESS REPLICATION MANAGEMENT

(71) Applicant: EMC IP Holding Company LLC, Hopkinton, MA (US)

(72) Inventors: Sunil Kumar, Bangalore (IN); Vinay Rao, Bangalore (IN); Boaz Michaely, Newton Center, MA (US); Arieh Don, Newton, MA (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 628 days.

(21) Appl. No.: 15/651,803

(22) Filed: Jul. 17, 2017

(51) Int. Cl.
G06F 16/27 (2019.01)
H04L 67/1095 (2022.01)
G06F 16/22 (2019.01)

(52) U.S. Cl.
CPC .......... *G06F 16/27* (2019.01); *G06F 16/2237* (2019.01); *H04L 67/1095* (2013.01)

(58) Field of Classification Search
CPC ........ G06F 17/30067; G06F 17/30575; G06F 17/30212; G06F 16/27; G06F 16/2237; H04L 67/1095
USPC ........................................................ 707/634
See application file for complete search history.

(56) References Cited

U.S. PATENT DOCUMENTS

| | | | | |
|---|---|---|---|---|
| 8,060,476 B1 * | 11/2011 | Afonso | ................... | G06F 16/13 707/823 |
| 9,690,670 B1 * | 6/2017 | Paulzagade | ......... | G06F 11/1464 |
| 9,858,154 B1 * | 1/2018 | Lyadvinsky | .......... | G06F 3/0619 |
| 2002/0078135 A1 * | 6/2002 | Venkatsubra | ........... | H04L 69/12 709/202 |
| 2009/0187929 A1 * | 7/2009 | Kushwaha | ......... | G06Q 30/0603 719/330 |
| 2009/0259749 A1 * | 10/2009 | Barrett | ................ | H04L 41/0631 709/224 |
| 2011/0078108 A1 * | 3/2011 | Kumar | ................ | G06F 11/3006 707/E17.037 |
| 2016/0269482 A1 * | 9/2016 | Jamjoom | ............ | H04L 67/1095 |
| 2016/0283259 A1 * | 9/2016 | Mehta | ................. | G06F 9/45558 |
| 2017/0300386 A1 * | 10/2017 | Shulga | ................ | G06F 11/1469 |

OTHER PUBLICATIONS

John, Spacey. "Pully vs Push Technology", Mar. 3, 2017, Simplicable, <https://simplicable.com/new/pull-vs-push-technology> (Year: 2017).*

Ayuso et al. "Communicating between the kernel and user-space in Linux using Netlink sockets", Aug. 2010, Software Practice and Experience 40(9):797-810 (Year: 2010).*

(Continued)

*Primary Examiner* — Hosain T Alam
*Assistant Examiner* — Robert F May
(74) *Attorney, Agent, or Firm* — Workman Nydegger

(57) ABSTRACT

Systems and methods for performing data protection operations including replication management or data copy operations. Agent-less data protections are performed. A management server is configured to perform data operations on a production host without installing an agent on the production host. A driver is adapted to aid in performing the data protection operations and communications between the management server and the driver such as commands are achieved via a storage array.

18 Claims, 3 Drawing Sheets

(56) References Cited

OTHER PUBLICATIONS

"What's the difference of the Userland vs the Kernal?", 2014, Unix & Linux, <https://unix.stackexchange.com/questions/137820/whats-the-difference-of-the-userland-vs-the-kernel> (Year: 2014).*

John, Spacey. "Pull vs Push Technology", Mar. 3, 2017, Simplicable, <https://simplicable.com/new/pull-vs-push-technology> (Year: 2017).*

* cited by examiner

AGENT-LESS REPLICATION MANAGEMENT

FIELD OF THE INVENTION

Embodiments of the present invention relate to systems and methods for managing data. More particularly, embodiments of the invention relate to systems and methods for performing copy or replication management of applications/data in a computing systems.

BACKGROUND

Computing systems are an integral part everyday life. Users, businesses and other entities rely on computing systems to perform a multitude of different functions. Computing systems are important, in part, because of the data stored in the computing systems. Airlines, for example, rely on the data in their computing systems in a multitude of ways, including allowing customers to make and manage reservations. Business, individuals, and other entities use computing systems in one form or another and, in each case, their applications/data is important.

Because data is so important, it is advisable to ensure that the data is protected and available for use. To this end, data is often backed up so that it can be restored if necessary. Simply backing up data, however, is being to be viewed as an opportunity lost. Data, including backup data, can be used in multiple ways. As a result, some computing systems are moving away from the traditional server centric backup systems. There is a move to copy data and to have multiple copies of the data available. Although data may be primarily copied for backup purposes, copies of the data can also be used, for example, for analytics, operations, and testing.

In order to enable these types of services, it is necessary to install an agent on the user's computing equipment. In other words, an agent is conventionally installed on the production hosts. Unfortunately, installing an agent on the production host is often difficult from a technological perspective and unpalatable from a customer's perspective.

BRIEF DESCRIPTION OF THE DRAWINGS

In order to describe the manner in which at least some aspects of this disclosure can be obtained, a more particular description will be rendered by reference to specific embodiments thereof which are illustrated in the appended drawings. Understanding that these drawings depict only example embodiments of the invention and are not therefore to be considered to be limiting of its scope, embodiments of the invention will be described and explained with additional specificity and detail through the use of the accompanying drawings, in which.

DETAILED DESCRIPTION OF SOME EXAMPLE EMBODIMENTS

Embodiments of invention relate to systems and methods for protecting data. More particularly embodiments of the invention relate to systems and methods for performing replications management (may also be referred to herein as data copy management or copy management). Generally, replication management is performed in the context of a production host (or multiple production hosts) and a storage array (or multiple storage arrays). By way of example and not limitation, the replication management server, production host and the storage array may be included a computing system such as a data center. Further, the production host, the storage array, and the replication management server may be connected using fiber channel and may also be accessible over other networks, such as the Internet.

Conventionally, replication management required a host agent to be installed on the production host. However, a host agent has several drawbacks. First, the development of the host agent should accommodate multiple operating systems and operating system versions. In addition, in order for a replication management server to communicate with the host agent, it is necessary for the management server to have the credentials that permit the replication management server to access the production host. Thus, the host agent is often viewed with suspicion by customers for various reasons, including security reasons, reliability reasons, and load reasons.

Embodiments of the invention relate to systems and methods for performing data protection operations, including replication management operations, in a computing system without installing an agent on the production host. An agent-less replication management system can perform the functions of a replicating management system without requiring direct communication between the production host and the replication management server. Embodiments of the invention thus relate to agent-less data protection operations (e.g., copy management operations, replication operations) performed in a computing system.

Figure 1:
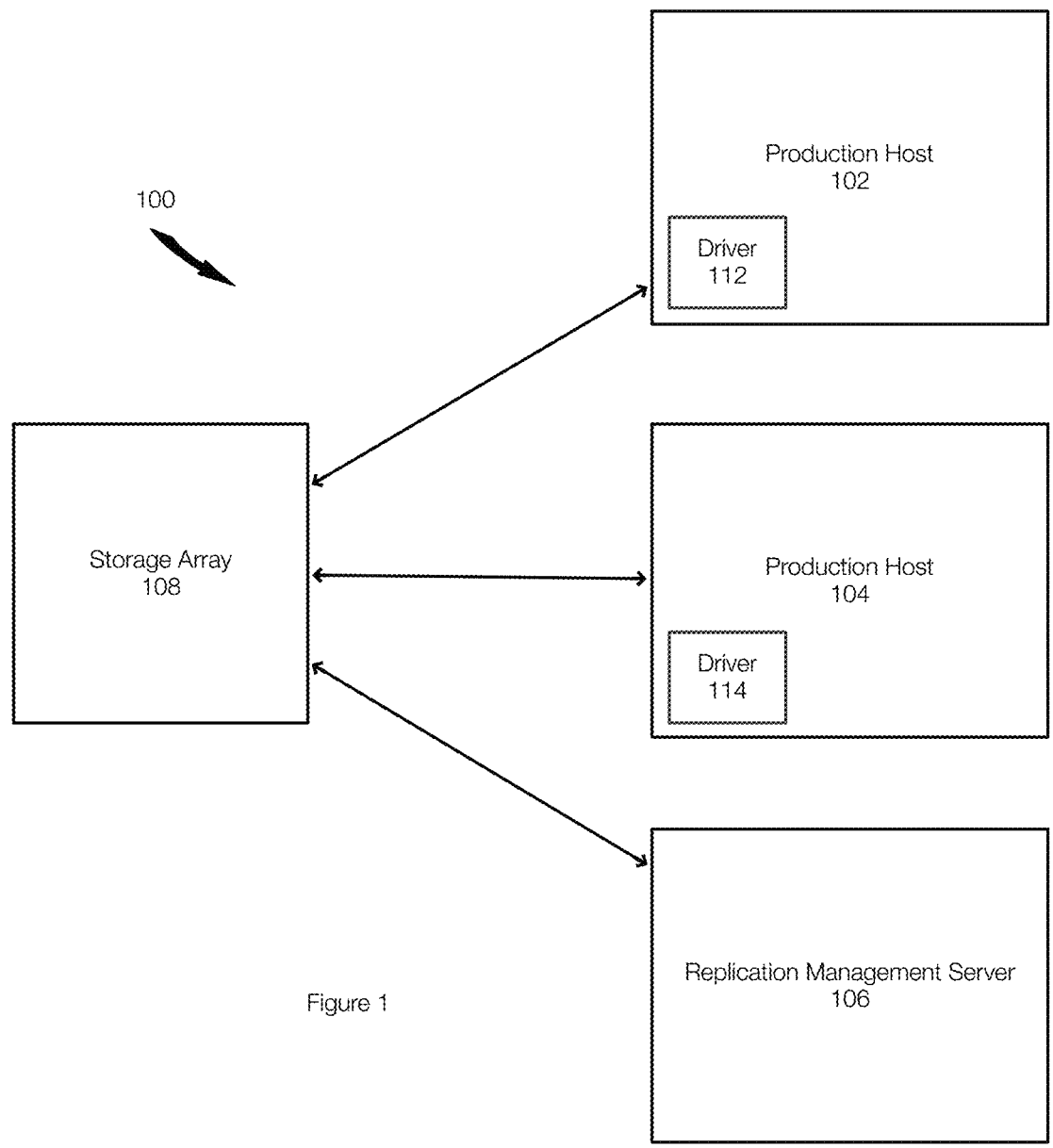
FIG. 1 illustrates an example of a computing system in which data protection including copy management may be performed.

FIG. 1 illustrates an example of a computing system 100 in which data protection operations such replication management operations are performed without an agent operating on or installed on the host. Embodiments of the invention are agent-less because the need for direct communication between the production host and the replication management server are not needed. This enhances the security of the production host at least because the replication management server no longer requires credentials to issue commands to the production host.

FIG. 1 illustrates a production host 102 that communicates with a storage array 108. The production host 104 may support multiple applications (e.g., servers, database, or the like). The applications operation on the production host 104 and the data stored on or by the production host 104 are protected on the storage array 108.

In FIG. 1, data protection operations including replication management may be provided to multiple production hosts (illustrated by production hosts 102 and 104) by the replication management server 106. Copies of the applications/data executing on the production hosts 102, 104 may be stored on a storage array 108.

The replication management server 106 manages the data (copies of the data/applications on the host 102 and/or the host 104) stored on the storage array 108. Replication management can include managing the copies stored on the storage array 108, generating new copies, issuing commands necessary in the context of replication management, performing restore operations, launching copies for reasons other than production (e.g., analytics, research).

A snapshot is an example of replicated data and the replication management server 106 may manage the snapshots of the production hosts 102, 104. As illustrated in FIG.

1, the data protection operations are performed in an agent-less manner. There is no direct communication between the production host 102 and the replication management server 106 and no direction communication between the production host 104 and the replication management server 106, and no need to install an agent on the production host 102 or the production host 104.

Even though embodiments of the invention relate to agent-less replication management, it may be necessary to execute commands or perform other operations on the production hosts 102, 104. This is achieved installing a driver on the production hosts. Thus, the driver 112 is installed on the production host 102 and the driver 114 is installed on the production host 104. The drivers 112, 114 are configured to perform at least the same functions as a host agent, but do not need to communicate directly with the replication management server 106

In one embodiment, communication between the production host 102 (and/or the production host 104) and the replication management server 106 is achieved, as necessary, by tunneling through or via the storage array 108. Advantageously, the replication management server 106 does not need to have any credentials to access the production host 102, 104 or an application operating thereon and does not need to access the production hosts 102, 104 or application/data present thereon. This improves security and operation of the production hosts 102, 104.

The replication management server 106 may control and direct the manner in which the replication operations are performed in the computer system 100. The storage array 108 is configured such that information (e.g., data, commands, messages, status, etc.) from the replication management server 106 are transmitted to or retrieved by the driver 112 installed on the production host 102. Similarly, the storage array 108 is configured such that information from the production host 102 can be transmitted to or retrieved by the replication management server 106. More specifically, the replication management server 106 may place information on the storage array 108 for the host 102. The driver 112 may periodically poll the storage array 108 and retrieve the information when present. Similarly, the driver 112 may place information on the storage array 108 that is then retrieved by the server 106.

Figure 2:
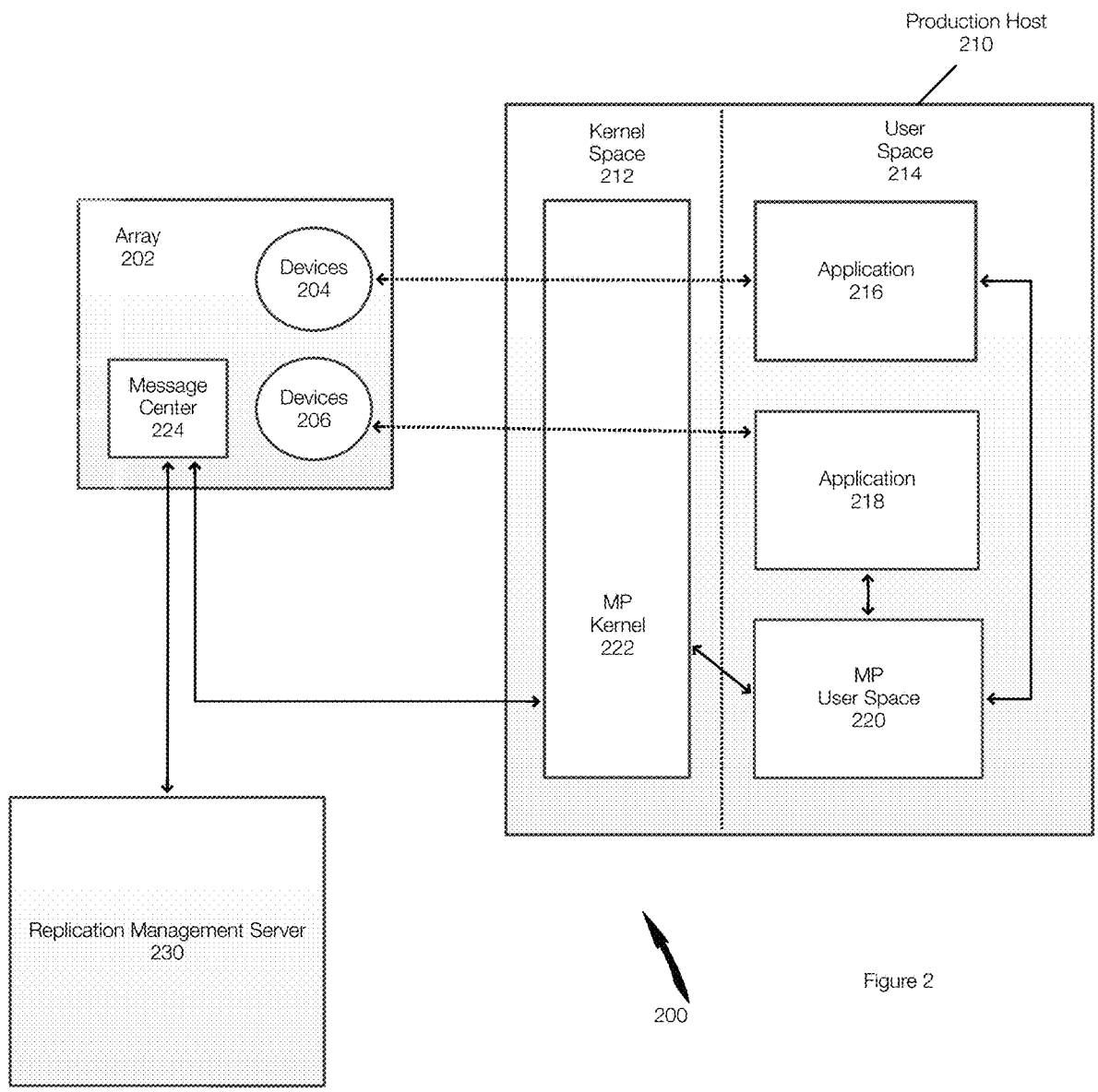
FIG. 2 is a more detailed illustration of systems and methods for performing copy management.

FIG. 2 illustrates a computing system 200, which is a more detailed illustration of the computing system 100. FIG. 2 illustrates a storage array or an array 202, a production host 210, and a replication management server or server 230. The sever 230 communicates with the array 202 and, in one embodiment, does not directly communicate with the production host 210. The production host 210 communicates with the array 202 and, in one embodiment, does not communicate directly with the server 230. The server 230 performs agent-less replication management of the production host 210 and, more specifically, of the applications/data instantiated, executing, or stored therein.

Although FIG. 2 illustrates a single production host 210, embodiments of the invention may relate to multiple production hosts. The production host 210 may be a virtualized host. The production host 210 may include a single operating system or may be configured to support multiple operating systems. In this example, the production host 210 includes at least one operating system that includes a kernel space 212 and a user space 214.

The user space 214 (also referred to herein as userland) typically refers to a portion of memory where all code of software that executes or runs outside of the kernel space 212 is run. The kernel space 212 is typically privileged and may be kept separate from the user space 214. In one example, the kernel space 212 is the space or memory where all kernel programs or modules, or drivers are placed and executed. User programs, in contrast, are typically located in and executed in the user space 214. By segregating the kernel space 212 from the user space 214, the computing system can be protected from malicious software, for example. Many device drivers are placed in the kernel space 212.

More generally, the kernel space 212 is the part of the operating system or computing device that controls low level system software and interactions with hardware. Higher level software such as user applications executes in the user space 214.

FIG. 2 illustrates, for example, an application 216 and an application 218. The applications 216 and 218 may be database applications, email servers, or other applications or servers. The applications 216 and 218 operate in the user space 214. From a data protection perspective, replication of the applications 216 and 218 (and/or their data) includes copying the applications and/or their data, respectively, the devices 204 and 206. The devices 204 and 206 may be storage devices (e.g., hard disk drives, flash storage, etc.). For example, snapshots or copies of the applications 216 and 218 may be maintained in the devices 204 and 206 of the array 202.

The production host 210 may also include an MP (Multi-Path Input/Output) Kernel 222. The MP kernel 222 is a framework that manages connections between the host 210 and the array 202 or connections to the devices 204 and 206 in the array 202. The MP kernel 222 can insure that the devices 204 and 206 are correctly recognized even when discovered through or associated with different physical paths. Stated differently, the MP kernel 222 can insure that there is more than one physical path between the host and devices in the array 202. Thus, if one physical path fails, another can be identified and used. The MP kernel 222 provides fault tolerance to the computing system 200 and can prevent data from being written incorrectly.

In the context of replication management, the MP kernel 222 could be used to ensure that the replicated application/data is transmitted to the appropriate storage and may prevent duplicate storage.

Conventionally, the MP kernel 222 has a minimal userland presence. The conventional userland presence is limited to display reasons (e.g., provide a graphical user interface) and to allow parameters and policies of the MP kernel 222 to be changed.

Embodiments of the invention provide a MP user space 220 (e.g., a userland driver or portion of the MP kernel 222) that operates in the user space 214. In one example, embodiments the MP user space 220 include or provide functions associated with the operations managed by the replication management server 230. However, this is an agent-less implementation because the MP user space 220 does not communicate directly with the management server 230.

The MP user space 220 is configured to communicate with the application 216 and 218. Generally, the MP user space 220 is configured to discover the applications on the host to be replicated or managed. The MP user space 220 may discover the names, configurations and devices. For example, the MP user space 220 will discover the applications 216 and 218, their names, their configurations and that they are associated with and using the devices 204 and 206. This information is then reported to the replication management server 230.

The MP user space 220 may be able to query the applications 216, 218, issue commands to the applications 216, 218 or otherwise control the applications 216, 218 as needed to perform data protection operations. For example, the MP user space 220 can cause the applications 216, 218 to quiesce so that a snapshot operation or copy can be performed. When an application quiesces, writes may be suspended, caches may be flushed, or the like so that an application consistent copy can be created. The application can then be un-thawed or released once the copy has been created.

In one example, the MP kernel 222 and the MP user space 220 are installed as part of the server install. This cancels the need to install a conventional host agent on each of the hosts afterward because the MP drivers are already present. Further, this can simply the deployment of the replication management system in subsequent deployments.

During operation, the MP user space 220 communicates with the MP kernel 222. The MP kernel 222, in turn, communicates with a message center 224 that has been established at the array 202. The management server 230 and the production host 210 or, more specifically, the MP user space 220 communicate using the message center 224. The management server 230 can leave messages for the MP user space 220 in the message center 224 and the MP user space 220 can leave messages for the management server 230 in the message center 224.

For example, the management server 230 manages copies associated with the production host 210 that are stored in the array 202. The management server 230 may manage snapshots or backups or copies of the applications 216, 218 and/or their data. In the course of these operations, the management server 230 and the MP user space 220 may communicate via the message center 224. As previously stated, the MP user space 220 also communicates through the MP kernel 222.

The message center 224 can be implemented in multiple ways. For example, a drive that both the replication management server 230 and the MP kernel 222 can read/write may be used as the message center 224. The messages themselves can use various methods to indicate when posted, when read, and the like. In one example, the messages are identified and retrieved by configuring the MP kernel 222 and the replication management server 230 to poll the message center.

When an action or operation needs to be performed on the host 210 or on an application, the management server 230 may leave or place a message (e.g., a management command) at the message center 224. As previously stated, the MP user space 220 communicates with the MP kernel 222. The MP kernel 222 may poll the message center 224 and, when a message or command is waiting, the MP kernel 222 may retrieve the command and transfer the message or command to the user space 220. The MP user space 220 will then execute the command or message.

For example, the MP user space 220 may query the operating system and/or the file system of the production host 210 to discover the applications: identify the names of the applications, properties of the applications, and devices being used by the application. The MP user space 220 may communicate this information back to the management server 230 using the message center 224. More specifically, the MP user space 220 sends this information to the MP kernel 222, which transmits the information to the message center 224 associated with the array 202. For example, this information may be written to a drive at the array 202.

The MP user space 220 receives commands from the management server 230 via the message center 224 and the MP kernel 222, which polls or otherwise communicates with the array 202 or with the message center 224 to obtain the commands from the management server 230. The MP user space 220 manages the applications and sends status to the management server 230 via the MP kernel 222. This communication between the host 210 and the replication management server 230 is an example of tunneling.

Using a tunneling mechanism, data protection operations can be initiated, applications can be discovered and profiled, commands can be performed, and data protection operations including replication or copying can be performed.

Figure 3:
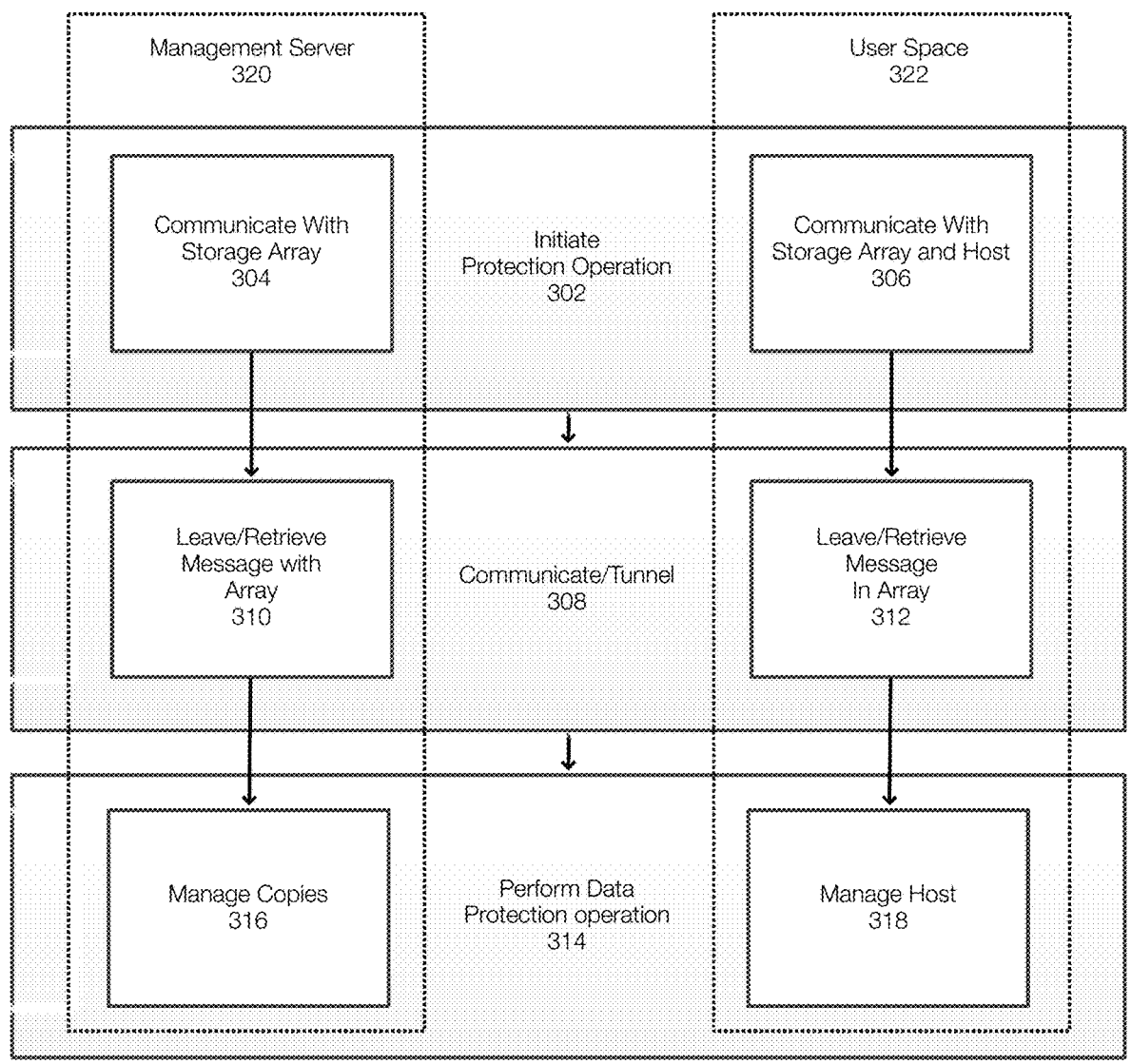
FIG. 3 is a flow diagram illustrating a method for performing copy management.

FIG. 3 illustrates an example of a method for performing a data protection operation in a computing system. The method 300 illustrated in FIG. 3 may have several implementations. For example, the steps or acts needed to perform a data protection operation can vary. Some steps or acts may be performed a single time or periodically. Once an application is discovered and setup for replication management, it may not be necessary to re-discover the application. However, the information determined during discovery can be updated over time. As properties, configurations, devices, and the like change, the replication management server is updated and informed of those changes.

FIG. 3 illustrates the method 300 from the perspective of the management server 320 and the user space 322 (an example of the MP user space). For example, a protection operation (e.g., a replication operation such as create a snapshot) may be initiated in box 302. This example assumes that the application has already been discovered. Otherwise, it may be necessary to first discover the application.

Initiating a protection operation may include acts or steps from each of the management server 320 and the user space 322. More specifically, the management server may communicate with the storage array at 304. This may include leaving a command at the storage array (e.g., at the message center). The command, by way of example, may be to query the host to identify applications operating thereon (when discovering applications), to quiesce an application or database (to ensure that an application consistent copy is obtained), to obtain an application configuration or properties, or the like.

This message is delivered to the user space 322 (e.g., the kernel driver retrieves the message and provides the retrieved message to the user space 322). The user space 322 may then perform the command. Thus, the user space 322 may communicate with the storage array via the kernel driver and the host 306 or applications operating thereon. The user space 322 may also communicate or issue commands to specific applications (e.g., quiesce) in accordance with the command from the replication management server.

The user space 322 may cause an update to be transmitted to the message center, which can then be retrieved by the replication management server.

During the course of an operation, the management server 320 may communicate with the user space 322 at 308. Thus, the management server 320 may leave messages and/or retrieve messages from the array at 310. Similarly, the user space 322 may leave messages and/or retrieve messages from the array at 312.

The communication at 308 may be used to control the data protection operations. The communication at 308 can be used to quiesce an application and initiate a snapshot. The status of the data protection operation can be conveyed to the management server by the communication at 308.

The message center at the array can be implemented in multiple ways. For example, messages can be associated with read/unread flags, a queue, a number system, or the like or combination thereof.

After communicating at 308, the data protection operation may be performed at 314. The management server 320 may manage the copies at 316 and the user space 322 may manage the host or applications on the host at 318. The user space 318 may control the flow of information or data from the production host to the storage array related to the data protection operation. The user space 318 can control how data is sent, when data is sent, the rate at which data is sent, or the like. This information may also be communicated to the management server 320. Further, the locations or devices at which the data is stored may also be conveyed to the management server.

Example Computing Devices and Associated Media

It should be appreciated that the present invention can be implemented in numerous ways, including as a process, an apparatus, a system, a device, a method, or a computer readable medium such as a computer readable storage medium or a computer network wherein computer program instructions are sent over optical or electronic communication links. Applications may take the form of software executing on a general purpose computer or be hardwired or hard coded in hardware. In this specification, these implementations, or any other form that the invention may take, may be referred to as techniques. In general, the order of the steps of disclosed processes may be altered within the scope of the invention.

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein.

As indicated above, embodiments within the scope of the present invention also include computer storage media, which are physical media for carrying or having computer-executable instructions or data structures stored thereon. Such computer storage media can be any available physical media that can be accessed by a general purpose or special purpose computer.

By way of example, and not limitation, such computer storage media can comprise hardware such as solid state disk (SSD), RAM, ROM, EEPROM, CD-ROM, flash memory, phase-change memory ("PCM"), or other optical disk storage, magnetic disk storage or other magnetic storage devices, or any other hardware storage devices which can be used to store program code in the form of computer-executable instructions or data structures, which can be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' can refer to software objects or routines that execute on the computing system. The different components, modules, engines, and services described herein may be implemented as objects or processes that execute on the computing system, for example, as separate threads. While the system and methods described herein can be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention can be performed in client-server environments, whether network or local environments, or in any other suitable environment. Suitable operating environments for at least some embodiments of the invention include cloud computing environments where one or more of a client, server, or target virtual machine may reside and operate in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for performing an agent-less data protection operation for a production host, the method comprising:
installing a driver on the production host that includes a kernel portion and a user space portion by installing the kernel portion of the driver in a kernel space and the user space portion of the driver in a user space, wherein the user space portion is configured to perform commands for the data protection operation in the user space without directly communicating with a replication management server, wherein the commands include communicating with other applications operating in the user space;
initiating the data protection operation by the replication management server storing a server message for the user space portion to a storage array, wherein the server message includes a command configured to be performed by the driver;
retrieving the server message from the storage array by the kernel portion accessing the storage array and providing the server message, by the kernel portion, to the user space portion;
performing the server message at the production host by the user space portion in the user space at the production host, wherein the command in the server message is performed by the user space portion at the production host without using credentials to access the production host and without direct communication between the driver and the replication management server, wherein the driver and the replication management server communicate via messages in the storage array;

storing, a host message, by the user space portion to the storage array via the kernel portion, wherein the host message is retrieved from the storage array by the replication management server, wherein the host message includes an update regarding the data protection operation, wherein the storage array is configured to store backups of the production host.

2. The method of claim 1, wherein initiating the data protection operation includes sending a command to quiesce an application operating on the production host.

3. The method of claim 1, wherein the user space portion executes the command included in the server message.

4. The method of claim 3, further comprising the kernel portion repeatedly polling the storage array for messages from the replication management server.

5. The method of claim 4, further comprising sending a report to the replication management server, wherein the user space portion sends the report to the kernel portion and the kernel portion sends the report to the storage array.

6. The method of claim 5, wherein the report comprises at least one of information or a status of the data protection operation.

7. The method of claim 1, further comprising performing the command in the server message by the user space portion.

8. The method of claim 7, further comprising, by the user space portion, identifying applications operating on the production host, determining configurations and properties of the applications, and identifying devices in the storage array associated with the applications.

9. The method of claim 1, further comprising exchanging messages between the replication management server and the driver via the storage array.

10. A method for performing a data protection operation in a computing environment that includes a replication management server, a storage array, and a production host, the method comprising:

performing communications between the replication management server and a driver installed on the production host via the storage array in order to initiate and perform the data protection operation, wherein the driver includes a kernel portion implemented in a kernel space and a user space portion implemented in a user space and wherein the driver is configured to perform functions of the data protection operation, wherein performing communications includes:

the replication management server storing server messages to the storage array and retrieving host messages from the production host stored on the storage array, wherein the server messages include commands to be performed by the user space portion;

the kernel portion storing the host messages from the user space portion to the storage array, retrieving the server messages from the storage array stored by the replication management server and delivering the server messages to the user space portion, wherein the host messages include updates regarding the data protection operation, wherein the user space portion is configured to perform the commands in the server messages at the production host in the user space without direct communication with the replication management server and without providing credentials from the replication management server to perform the commands sent by the replication management server in the user space; and performing the data protection operation, wherein backups of the production host are stored on the storage array.

11. The method of claim 10, wherein the commands are performed by the user space portion in the user space.

12. The method of claim 11, wherein the user space portion is configured to communicate with applications operating on the production host in the user space and communicate with the kernel portions.

13. The method of claim 12, wherein the host messages are generated by the user space portion, wherein the user space portion provides the host messages to the kernel portion and the kernel portion transmits the host messages to the storage array.

14. The method of claim 13, wherein the kernel portion retrieves the server messages from the storage array and provides the server messages to the user space portion, wherein the user space portion performs the commands in the server messages.

15. The method of claim 10, wherein the commands from the replication management server are performed in the user space by the user space portion and include at least one of determining names of applications on the production host, configurations of the applications, and devices associated with the applications, quiescing at least one of the applications, or performing the data protection operation.

16. The method of claim 10, wherein the data protection operation includes one or more of creating a copy of the application and/or its data or creating a snapshot of the application and/or its data.

17. The method of claim 10, wherein communications are performed without direct communication between the replication management host and the user space portion or the kernel portion.

18. The method of claim 10, wherein the user space portion is installed during a server install such that the data protection operation can be performed without providing the replication management server with credentials needed to access the production host or of the applications operating on the production host.

* * * * *